(12) United States Patent
Hoogerbrugge

(10) Patent No.: US 7,779,205 B2
(45) Date of Patent: Aug. 17, 2010

(54) COHERENT CACHING OF LOCAL MEMORY DATA

(75) Inventor: Jan Hoogerbrugge, Helmond (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 418 days.

(21) Appl. No.: 11/719,780

(22) PCT Filed: Nov. 8, 2005

(86) PCT No.: PCT/IB2005/053662

§ 371 (c)(1),
(2), (4) Date: May 21, 2007

(87) PCT Pub. No.: WO2006/056900

PCT Pub. Date: Jun. 1, 2006

(65) Prior Publication Data

US 2009/0150619 A1    Jun. 11, 2009

(30) Foreign Application Priority Data

Nov. 24, 2004    (EP) ................................ 04106032

(51) Int. Cl.
*G06F 12/08* (2006.01)
(52) U.S. Cl. ................. 711/119; 711/121; 711/130; 711/131; 711/144; 711/156
(58) Field of Classification Search .............. 711/119
See application file for complete search history.

(56) References Cited

U.S. PATENT DOCUMENTS 5,291,442 A    3/1994    Emma et al.

| | | | |
|---|---|---|---|
| 5,590,308 A | * | 12/1996 | Shih .......................... 711/136 |
| 5,802,577 A | | 9/1998 | Bhat et al. |
| 5,832,534 A | | 11/1998 | Singh et al. |

(Continued)

FOREIGN PATENT DOCUMENTS

EP    0596636 A2    5/1994

OTHER PUBLICATIONS

Hennessy et al: "Computer Architecture a Quantitative Approach", Third Edition, 2003, Morgan Kaufmann Publishers, Chapter 5, pp. 389-512.

*Primary Examiner*—Hetul Patel

(57) ABSTRACT

A multi processor system 1 comprises a plurality of processors 21 to 25, a system bus 30 and a main system memory 40. Each processor 21 to 25 is connected to a respective cache memory 41 to 45, with each cache memory 41 to 45 in turn being connected to the system bus 30. The cache memories 41 to 45 store copies of data or instructions that are used frequently by the respective processors 21 to 25, thereby eliminating the need for the processors 21 to 25 to access the main system memory 40 during each read or write operation. Processor 25 is connected to a local memory 50 having a plurality of data blocks (not shown). According to the invention, the local memory 50 has a first port 51 for connection to its respective processor 25. In addition, the local memory 50 has a second port 52 connected to the system bus 30, thereby allowing one or more of the other processors 21 to 24 to access the local memory 50. The invention enables the coherent caching of local memory data, using local memory devices that are less expensive, faster, and having more predicable timing than cache memories.

13 Claims, 3 Drawing Sheets

U.S. PATENT DOCUMENTS 6,356,983 B1 3/2002 Parks
2003/0018859 A1 1/2003 Smith
2006/0253655 A1* 11/2006 Pudipeddi et al. .......... 711/130

* cited by examiner

COHERENT CACHING OF LOCAL MEMORY DATA

FIELD OF THE INVENTION

The invention relates to processor systems having local memory, and in particular to coherent caching of local memory data in multi processor systems.

BACKGROUND

There is a continual drive to increase the speed of processor systems and their ability to handle larger amounts of data. Parallelism is increasing being used in pursuit of this drive to increase speed, whereby a complex program is executed as a plurality of less complex routines run at the same time to improve performance. Another tool (that is used to increase speed is the provision of cache memories.

A cache memory works by storing copies of frequently used portions of data and instructions from the main system memory in a closely coupled, low latency cache memory. This means that data or instructions that are accessed at frequent intervals are taken from the cache memory, thereby avoiding the need to access the main system memory. Thus, as each new read and write command is issued, the system looks to the cache memory first to determine if the information is stored in the cache. If the information is available in the cache memory, access to the main system memory is not required and the command may be processed or data accessed much more readily.

Inherent in a cache memory system is a need to guarantee coherency between the data copy in one or more processor caches and the main system memory itself. One method of ensuring coherency is the "MESI" protocol, which includes state information for every cache block. The state information includes indicating whether the cache line is Modified, Shared, Exclusive and Invalid (MESI).

In a MESI system, when an unshared cache line is accessed it is marked exclusive (E). A subsequent read does not change the state, but a subsequent write to the cache line changes the state to modified (M). If another processor in the multi-processor system loads the cache data into its own cache, the cache line is marked as shared (S). If a processor wishes to write data to a shared cache, an invalidate command must be sent to all other processors, or at least to all other processors having a copy of the shared data. Before a processor can load data from a modified cache line the processor having the modified cache line must write the data back to memory and mark the data as being shared (S). Any read or write to a cache line that is marked invalid (I) results in a cache miss.

Protocols such as the MESI protocol described above ensure that cache memories are kept coherent, which makes them transparent for software in a multiprocessor system. Further details on cache memories and cache memory coherency can be found in the publication Computer Architecture a Quantitative Approach, Third Edition, John L. Hennessy and David A. Patterson, 2003.

Although cache memories offer the advantages mentioned above, they have the disadvantage of being complicated to design, and tend to be relatively expensive compared to other types of memory devices. For example, cache memories require comparators to check tags against the presented address, and selectors to select the way that matches. Cache memories also have Least Recently Used (LRU) bits for managing replacement of data, and require copyback functionality to manage write backs of modified data. Cache memories also tend to consume more power than other types of memory because of the way that bits are accessed in a cache memory. Furthermore, the manner in which data will either hit or miss in the cache depends on the replacement policy (typically LRU), which is difficult to predict for software.

Processor systems, for example processors used for digital signal processing, also use local memory as a means of increasing processing speed. A local memory allows read and/or write operations to be made directly between the processor and the local memory, rather than with a separate main memory, for example a random access memory (RAM). While a local memory allows processing speed to be increased in terms of the particular processor that has access to the local memory, it does not contribute any further advantages to a multi-processor system.

The aim of the present invention is to provide a multi processor system in which coherent caching of local memory data is provided.

SUMMARY

According to a first aspect of the invention there is provided a multi processor system comprising: a plurality of processors, one or more of the processors having an associated cache memory; a system bus for connecting the plurality of processors; a local memory associated with one of the plurality of processors; wherein the local memory is adapted to be accessed by its associated processor, and further adapted to be accessed by another of the processors in the multi processor system.

The invention has the advantage of providing a local memory that has a predictable timing behaviour, is fast, has low power and is inexpensive, while also enjoying the advantage of enabling other processors in the multi-processor system to access the local memory.

According to another aspect of the invention, there is provided a method of processing data in a multi processor system comprising a plurality of processors connected to a system bus, at least one of the processors having a cache memory, the method comprising the steps of: providing a local memory, the local memory being connected to an associated processor; and configuring the local memory such that it can be accessed directly by its associated processor, and accessed by one or more of the other processors via the system bus.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION OF A PREFERRED EMBODIMENT OF THE INVENTION

Figure 1:
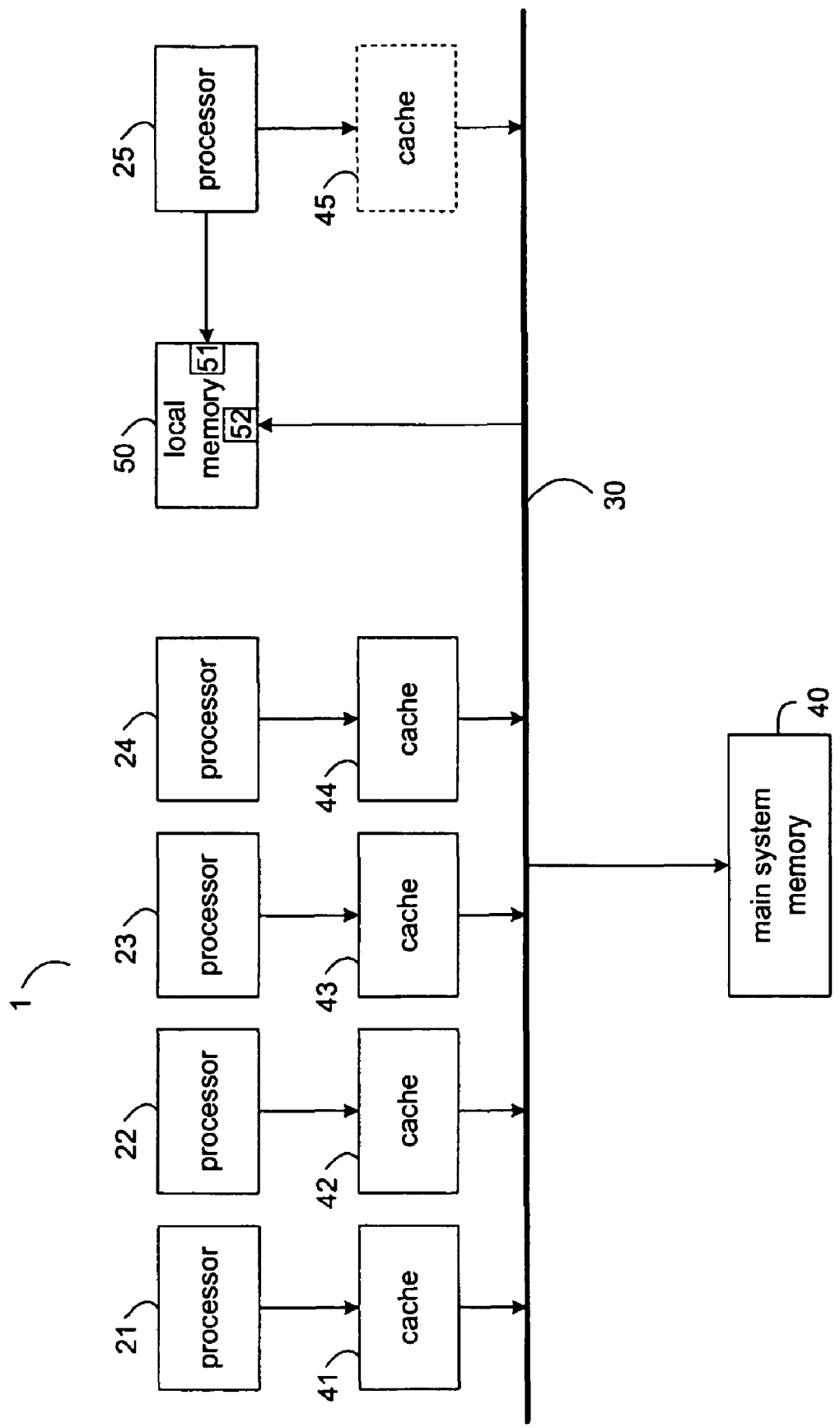
FIG. 1 shows a high level view of the multi processor system according to a preferred embodiment of the invention.

FIG. 1 shows a multi processor system 1 according to the present invention. The multi-processor system 1 comprises a plurality of processors 21 to 25, a system bus 30 and a main system memory 40. Each processor 21 to 25 is connected to a respective cache memory 41 to 45, with each cache memory 41 to 45 in turn being connected to the system bus 30. As explained above, the cache memories 41 to 45 store copies of data or instructions that are used frequently by the respective processors 21 to 25, thereby eliminating the need for the processors 21 to 25 to access the main system memory 40 during each read or write operation.

Processor 25 is connected to a local memory 50 having a plurality of data blocks (not shown). According to the invention, the local memory 50 has a first port 51 for connection to its associated processor 25. In addition, the local memory 50 has a second port 52 connected to the system bus 30, thereby allowing one or more of the other processors 21 to 24 to access the local memory 50.

It is noted that, although the preferred embodiment shows the processor 25 being connected to a cache memory 45 in addition to the local memory 50, it is noted that the cache memory 45 is optional, and that the processor 25 could simply be connected to just the local memory 50. Furthermore, it is also noted that, although the multi-processor system of the preferred embodiment is shown with only one processor 25 having a local memory 50, it will be appreciated that one or more of the other processors 21 to 24 could also be connected to a respective local memory.

Therefore, it will be appreciated that the second port 52 of the local memory 50 allows the other processors 21 to 24 to access the local memory 50 in addition its associated processor 25 (albeit not as fast as the access between the processor 25 and the local memory 50).

The invention allows caching of the data in the local memory 50 by the other processors 21 to 24 in a manner that is transparent to the software. This makes systems with local memories and cache coherency easier to program.

Coherency of the local memory 50 is made possible by associating first and second status bits to every block in the local memory 50. Preferably, each data block in the local memory has the same size as the cache coherence granularity (typically 32 or 64 bytes) in the system.

The first status bit is termed the Shared bit, and is set when another processor in the system reads the block by means of a read-shared command.

The second status bit is termed the Invalid bit, and is set when another processor in the system reads the data block by means of a read-exclusive command or issues an upgrade command on the data block.

The processor 25 that is associated with the local memory 50, ie the processor 25 that "owns" the local memory 50, checks the Shared and Invalid bits whenever the processor 25 accesses its local memory 50.

Figure 2:
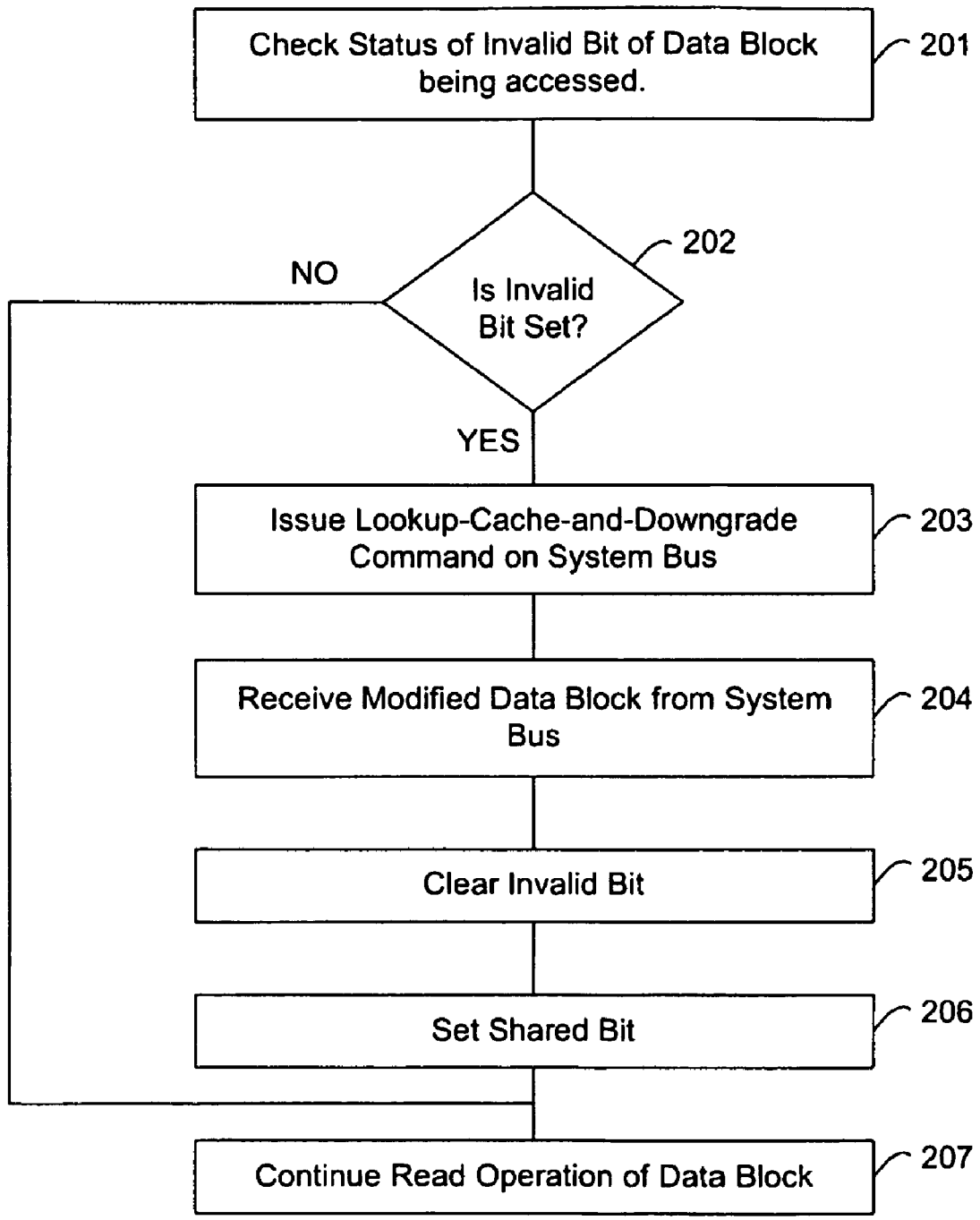
FIG. 2 shows a flow chart describing a Read operation according to the present invention.

FIG. 2 shows a flow chart describing a Read operation being performed by the processor 25 on its local memory 50. In step 201, the processor 25 checks the Invalid bit of the data block that is being accessed in local memory 50. If the Invalid bit is not set, the processor 25 simply continues with the read operation, step 207. However, if the Invalid bit is set, the processor 25 issues a lookup-cache-and-downgrade command on the system bus 30, step 203. The lookup-cache-and-downgrade command requests that any processor 21 to 25 that holds the data block in modified state to send the modified data block back to the local memory 50. After the modified data block has been received, step 204, the Invalid bit is cleared, step 205, and the Shared bit is set, step 206. The read operation is then completed as normal, step 207. It is noted that the Shared bit is set because the processor 21 to 25 that provided the data block keeps a copy of the data block in a shared state in its respective cache memory 41 to 45. It is noted from the above that the processor 25 is also able to cache data stored in its local memory. This may occur in processors that do not select between local and system memory based on a memory address but on the op-code of an instruction.

Figure 3:
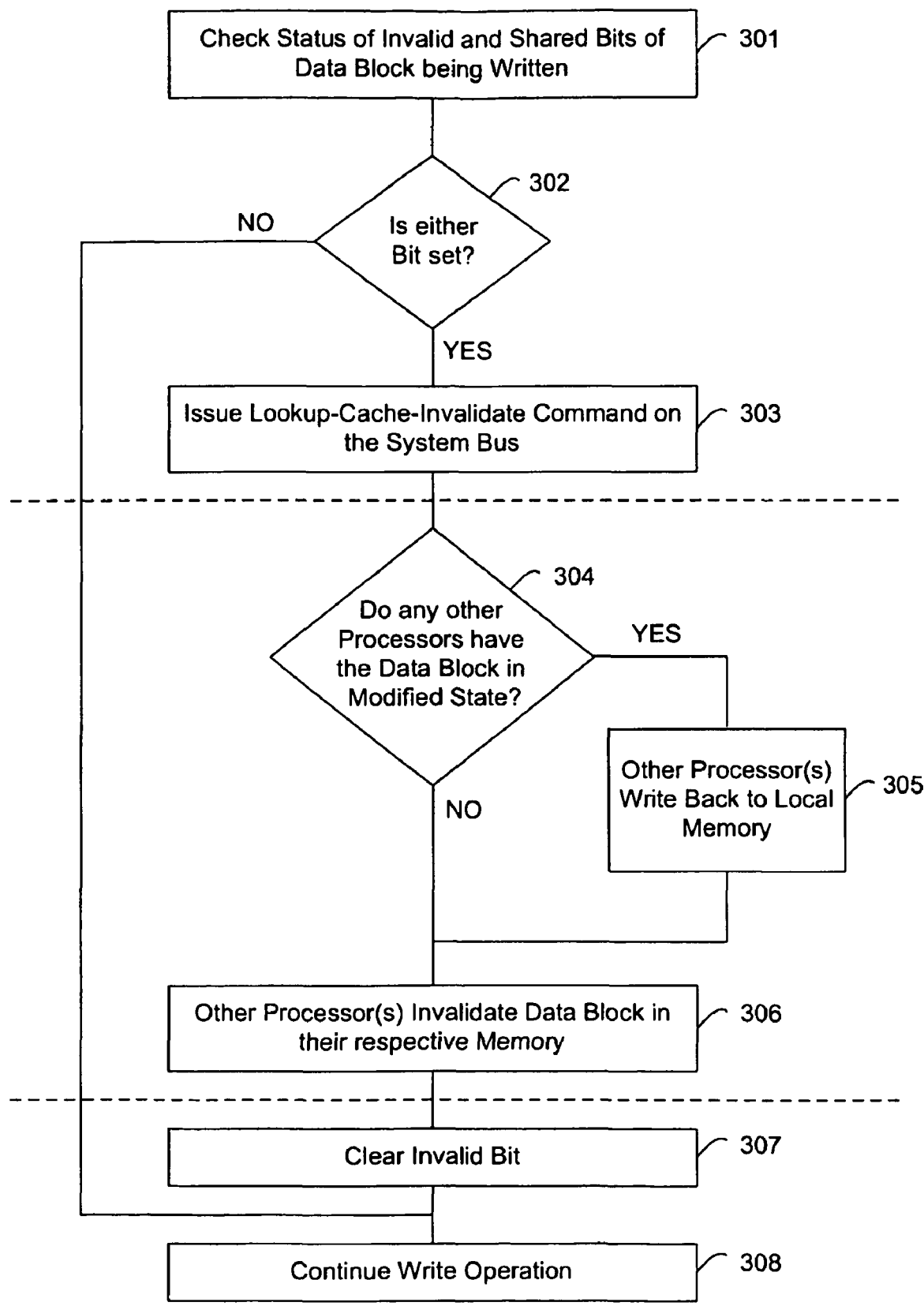
FIG. 3 shows a flow chart describing a Write operation according to the present invention.

FIG. 3 shows a flow chart describing a Write operation to the local memory 50. In step 301, the processor 25 making the write operation checks both the Invalid and Shared bits of the data block being written. In step 302, the processor 25 determines whether one of the bits is set. If one of the bits has been set, the processor 25 issues a lookup-cache-and-invalidate command on the system bus, step 303. The lookup-cache-and-invalidate command requests processors 21 to 25 that have the data block cached in their respective cache memories 41 to 45 to invalidate the data block.

If one of the processors 21 to 25 has the data block in modified state, the respective processor(s) writes the modified data block back to the local memory 50 prior to invalidation. After the modified data block has been received back at the local memory 50, the Invalid bit is cleared, step 307, and the write operation is completed, step 308.

It will be appreciated that steps 304 to 306 are performed by the respective processor(s) that have the data block in a modified state.

If it is determined in step 302 that neither of the Invalid or Shared bits are set, the write operation continues as normal, step 308.

A copyback of data (because it is "victimized") causes a reset of the Invalid bit of its data block in local memory. This is because, whenever a new block of data is loaded into the data cache, old data has to be removed from the data cache to make place for the new data. The old data is said to be victimized. If the old data has been modified by the processor, the data has to be written back to the memory where it came from, ie copyback.

The first and second status bits, ie the Shared bit and the Invalid bit, are stored in the location where the data is originally stored, and not where it is cached. In other words, the first and second status bits are stored in the local memory, and not in the cache memories.

The "read-shared", "read-exclusive", "lookup-cache-and-downgrade", and "lookup-cache-and-invalidate" operation are all commands that are found in a typical bus protocol that supports cache coherency. In particular:
Read-shared is used to read data with the intention to read it.
Read-exclusive is used to read data with the intention to modify it.
Lookup-cache-and-downgrade requests the processor that has the data in modified state to bring it back to shared state.
Lookup-cache-and-invalidate requests the processors that have the data in their cache to remove it from the cache.

The invention described above illustrates how processors with local memory can be incorporated in a system with cache coherency. The other processors can cache the data in the local memory without requiring the software to be aware of this.

Furthermore, the invention has the advantage of providing coherent caching of local memory data, the local memories being typically easier to design than caches, having a predictable timing behaviour, being faster. In addition, local memories use less power and are less expensive.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A multi processor system comprising:
   a system bus;
   a main memory accessible via the system bus;
   a plurality of processors connected to the system bus, each of the processors having an associated cache memory;
   a non-cache local memory associated with a first processor of the plurality of processors, the non-cache local memory being accessible by the plurality of processors via the system bus;
   wherein the non-cache local memory is adapted to be accessed by the first processor, and further adapted to be accessed by other processors of the plurality of processors in the multi processor system, wherein the non-cache local memory comprises a first port for communicating directly with the first processor, and a second port for communicating with the other processors via the system bus, and wherein the non-cache local memory is a separate memory than the main memory.

2. The multi processor system as claimed in claim 1, wherein the non-cache local memory is configured to operate as a coherent memory for the cache memories.

3. The multi processor system as claimed in claim 2, wherein the non-cache local memory is adapted to store information in data blocks, each data block being assigned a first status bit and a second status bit, the first status bit and the second status bit provided to maintain coherency between the local memory and the cache memories.

4. The multi processor system as claimed in claim 3, wherein the first status bit is adapted to indicate if a particular data block is being shared, and wherein the second status bit is adapted to indicate if the particular data block is invalid.

5. The multi processor system as claimed in claim 3, wherein the system is adapted to store the first and second status bits in the non-cache local memory where the data block is originally stored.

6. The multi processor system as claimed in claim 3, wherein the non-cache local memory is adapted to store data in block sizes corresponding to the cache coherence granularity of the system.

7. A method of processing data in a multi processor system comprising a system bus, a main memory accessible via the system bus, and a plurality of processors connected to the system bus, each of the processors having a cache memory, the method comprising acts of:
   providing a non-cache local memory that is associated with a first processor of the plurality of processors, the non-cache local memory being accessible by the plurality of processors via the system bus; and
   configuring the local memory to be accessed directly by the first processor and to be accessed via the system bus by other processors of the plurality of processors, wherein the act of providing the non-cache local memory comprises an act of providing the non-cache local memory having a first port of communicating directly with the first processor, and a second port for communicating with the other processors via the system bus, and wherein the non-cache local memory is provided as a separate memory than the main memory.

8. The method as claimed in claim 7, further comprising acts of assigning first and second status bits to each data block stored in the non-cache local memory, the first and second status bits acting to maintain coherency between the non-cache local memory and the cache memories.

9. The method as claimed in claim 8, wherein the first status bit indicates if a particular data block is being shared, and wherein the second status bit indicates if the particular data block is invalid.

10. The method as claimed in claim 9, further comprising an act of storing the first and second status bits in the non-cache local memory where the data block is originally stored.

11. The method as claimed in claim 9, wherein a read operation between the first processor and the non-cache local memory comprises an act of:
    determining the status of the data block being accessed and, if the data block is determined to be invalid, performing acts of:
    retrieving modified data blocks via the system bus from each of the one or more other processors having a modified data block stored in its associated cache memory;
    clearing the invalid status bit;
    setting the shared status bit; and
    completing the read operation.

12. The method as claimed in claim 9, wherein a write operation between the first processor and the non-cache local memory comprises acts of:
    determining the status of the data block being written and, if the data block is determined to be invalid or shared, performing acts of:
    determining if any other processors have a modified data block, and if so, requesting such processors to write back the modified data block to the local memory, and invalidating the data block in the respective memory of each of the other processors;
    clearing the invalid status bit; and
    completing the write operation.

13. The method as claimed in claim 7, wherein the non-cache local memory stores data in block sizes corresponding to the cache coherence granularity of the system.

* * * * *